United States Patent
Danner et al.

(10) Patent No.: US 10,632,901 B2
(45) Date of Patent: Apr. 28, 2020

(54) ADDITIONAL HEADLAMP FOR VEHICLES

(71) Applicant: ZKW Group GmbH, Wieselburg (AT)

(72) Inventors: Markus Danner, Ollersdorf (AT); Lukas Taudt, Wieselburg (AT)

(73) Assignee: ZKW GROUP GMBH, Wieselburg (AT)

(*) Notice: Subject to any disclaimer, the term of this patent is extended or adjusted under 35 U.S.C. 154(b) by 97 days.

(21) Appl. No.: 16/061,816

(22) PCT Filed: Dec. 9, 2016

(86) PCT No.: PCT/AT2016/060121
§ 371 (c)(1),
(2) Date: Jun. 13, 2018

(87) PCT Pub. No.: WO2017/100812
PCT Pub. Date: Jun. 22, 2017

(65) Prior Publication Data
US 2018/0370419 A1   Dec. 27, 2018

(30) Foreign Application Priority Data
Dec. 17, 2015 (AT) .................................. 51074/2015

(51) Int. Cl.
*B60Q 1/18* (2006.01)
*F21S 41/29* (2018.01)
(Continued)

(52) U.S. Cl.
CPC .................. *B60Q 1/18* (2013.01); *B60Q 1/24* (2013.01); *F21S 41/143* (2018.01); *F21S 41/24* (2018.01);
(Continued)

(58) Field of Classification Search
CPC .... B60Q 1/18; B60Q 1/24; F21S 41/24; F21S 41/663; F21S 41/143; F21S 41/29; F21S 41/65
(Continued)

(56) References Cited

U.S. PATENT DOCUMENTS 8,475,019 B2 * 7/2013 Woodward ......... G02B 27/0955
362/511
8,721,142 B2 * 5/2014 Lambert .................. B60Q 1/20
362/511
(Continued)

FOREIGN PATENT DOCUMENTS

DE   102008048764 A1   3/2010
DE   102009009472 A1   8/2010
(Continued)

OTHER PUBLICATIONS

International Search Report and Written Opinion for PCT/AT2016/060121, dated Mar. 1, 2017 (11 pages).
Office Action issued in Austrian Application No. A51074/2015, dated Oct. 24, 2016 (3 pages).

*Primary Examiner* — Bryon T Gyllstrom
(74) *Attorney, Agent, or Firm* — Eversheds Sutherland (US) LLP (57) ABSTRACT

The invention relates to an additional headlamp (3, 3', 3") for a vehicle, which headlamp is designed to produce a light image in front of the vehicle (1) by emitting light from at least one light module (5) and to project said light image in front of the vehicle by means of a downstream imaging optical unit (8), wherein a first light module (6) is designed to produce a first light image having at least one first light distribution having at lease one first, substantially vertically oriented, linear intensity maximum, and a second light module (7) is designed to produce a second light image having a second light distribution having at lease one second, substantially rectangular intensity maximum, and
(Continued)

the light images of both light modules (6, 7) are superposed, wherein the first intensity maximum is vertically below the second intensity maximum.

22 Claims, 11 Drawing Sheets

(51) Int. Cl.
| | | |
|---|---|---|
| *F21S 41/24* | (2018.01) | |
| *F21S 41/143* | (2018.01) | |
| *F21S 41/663* | (2018.01) | |
| *B60Q 1/24* | (2006.01) | |
| *F21S 41/65* | (2018.01) | |
| *F21S 41/255* | (2018.01) | |
| *F21Y 105/12* | (2016.01) | |
| *F21Y 103/10* | (2016.01) | |

(52) U.S. Cl.
CPC ............... *F21S 41/29* (2018.01); *F21S 41/65* (2018.01); *F21S 41/663* (2018.01); *F21S 41/255* (2018.01); *F21Y 2103/10* (2016.08); *F21Y 2105/12* (2016.08)

(58) Field of Classification Search
USPC .......................................................... 362/466
See application file for complete search history.

(56) References Cited

U.S. PATENT DOCUMENTS

| | | | | |
|---|---|---|---|---|
| 9,046,237 | B2* | 6/2015 | Stefanov | F21S 41/143 |
| 2006/0023461 | A1* | 2/2006 | Knight | B60Q 1/076 |
| | | | | 362/466 |
| 2007/0041207 | A1* | 2/2007 | Ishida | B60Q 1/0041 |
| | | | | 362/538 |
| 2012/0275173 | A1* | 11/2012 | Hamm | B60Q 1/1423 |
| | | | | 362/487 |
| 2014/0175978 | A1* | 6/2014 | Kobayashi | B60Q 1/1423 |
| | | | | 315/82 |
| 2014/0321141 | A1* | 10/2014 | Bauer | B60Q 1/085 |
| | | | | 362/511 |
| 2015/0285456 | A1* | 10/2015 | Moser | F21S 41/30 |
| | | | | 362/517 |
| 2016/0069528 | A1* | 3/2016 | Albou | B60Q 1/143 |
| | | | | 362/516 |
| 2016/0265733 | A1* | 9/2016 | Bauer | G02B 3/0006 |
| 2017/0067609 | A1 | 3/2017 | Ichikawa et al. | |
| 2018/0073718 | A1* | 3/2018 | Miyake | F21V 29/76 |

FOREIGN PATENT DOCUMENTS

| | | |
|---|---|---|
| DE | 102012002458 A1 | 8/2012 |
| DE | 102014203313 A1 | 8/2015 |
| EP | 2532950 A1 | 12/2012 |

\* cited by examiner

Detail B

ADDITIONAL HEADLAMP FOR VEHICLES

The invention relates to an additional headlight for a vehicle, this additional headlight being set up to produce a light pattern in front of the vehicle by emitting light from at least one light module and to project this light pattern in front of the vehicle by downstream imaging optics.

The development of current headlight systems is more and more focused on the desire to be able to project onto the road a light pattern that can be rapidly changed and adapted to respective traffic, road, and light conditions. To accomplish this, various headlights are used, for example main headlights and additional headlights, which produce different light patterns on the road. Here the term "road" is used for simplicity, since of course whether a light pattern is actually on the road or also extends beyond it depends on the local conditions. In theory, the term "light pattern" as it is used here corresponds to a projection onto a vertical surface according to the relevant standards that relate to motor vehicle lighting engineering.

To meet the mentioned need, among other things headlights have been developed that form a light matrix from multiple individual light emitters. Such lighting devices are common in vehicle construction and serve, for example, to image glare-free high beams, as a rule by emitting the light from multiple light sources and concentrating it in the emission direction by a corresponding number of adjacent light guides (auxiliary optics/primary optics). The light guides have a relatively small funnel-shaped cross section, and therefore each of them emits the light of the individual light source associated with it in a very concentrated form in the direction of the beam. The light guides carry the light from the light sources to a position that is approximated as well as possible on spatially curved plane, the Petzval surface, of the upstream imaging optics. However, especially when a larger number of high-power light sources is used, this type of matrix headlight has limitations relating to the dissipation of the thermal loss power of these high-power light sources. Consequently, headlights that produce dynamic light patterns with especially high intensity can be produced only with great expense.

Each different traffic situation places specific requirements on the headlights of a vehicle, and these requirements differ from one another. In addition to illuminating the road by low beams or high beams, it can also be desired to draw the driver's attention to special danger situations by suitable visual signals. An example of such a danger situation is a road narrowing due to a construction site. Many drivers have difficulty estimating the distance between the vehicle and a roadside border, since the driver does not have a direct view, from the driver's perspective, of the roadside border and the outer edge of the vehicle. To accomplish this, the function of an "Optical Lane Assist" has already been proposed.

DE 10 2009 009 472 A1 describes a system that projects lines onto the road in front of the vehicle, to signal to the driver a safe avoidance direction if the probability of a collision is detected.

One goal of this invention is to find a simple, compact, and economical embodiment of a line headlight.

The invention accomplishes this with an additional headlight of the type mentioned at the beginning by combining the function of an additional high beam light with the function of a line light, in order to achieve a very compact type of construction by realizing both functions in a common component, and thereby to obtain cost advantages. Thus, an additional headlight of the type mentioned at the beginning is improved by setting up a first light module to produce a first light pattern with at least one first light distribution with at least one first essentially vertically oriented line-shaped maximum intensity, and setting up a second light module to produce a second light pattern with a second light distribution with at least one second, essentially rectangular maximum intensity, and superimposing the light patterns of the two light modules, the first maximum intensity being located vertically under the second maximum intensity.

Especially if multiple illumination devices with similar illumination characteristics are integrated into a common component, the achieved advantage is clearly increased. According to the invention, an additional high beam light is combined in one component with a line light, each of the two illumination devices having high light output with strong optical concentration, i.e., with small aperture. The advantages of this are, among others, a simple, combined design of the projector lens, and common cooling or electrical control of the two power light sources. The assembly of the headlight is simplified by, among other things, common primary optics and mask, and the reduced number of mounting devices results in lower material costs, smaller size, and shorter assembly time.

The entire projection arrangement consists of a light source, primary optics, and imaging optics (projector lens). The imaging optics can, depending on the design, lead to distortions. Distortion is a geometric optical aberration of optical systems that leads to a local change in imaging scale. The change in scale is based on a change in the magnification as the pixel gets farther away from the optical axis. Therefore, the distortion is rotationally symmetric about a point, which is also called center of distortion. The distortion is caused by masks that narrow the image beam in front of or behind the principal plane of an optical system with spherical aberration. If the magnification increases toward the edges of the image field, then a square is distorted in the shape of a pincushion. The opposite case is called barrel distortion. Higher-order distortions can also occur, and the superimposition of various orders can produce a wave-shaped image of straight lines ("wave distortion"). The measurement of the distortion is known according to DIN ISO 9039: Optics and photonics—Quality evaluation of optical systems—Determination of distortion (ISO 9039: 2008).

It is also clear that when a light pattern is projected onto the road in front of the vehicle there can be projection distortions, for example a light pattern can appear trapezoidally distorted on the road, since the projection plane is not oriented normal to the emission direction of the light. These projection distortions arise in addition to the previously mentioned distortions.

Both projection distortions as well as distortions can be reduced or compensated for by corresponding predistortion.

Therefore, it is favorable, when the light distributions are produced in the headlight, to perform a predistortion, for example by a mask, and as a result to project a light pattern that has been corrected altogether, or at least to reduce the disturbing effect.

Consequently, the first essentially vertically oriented line-shaped maximum intensity means the corrected light projection in which the projection distortions and/or distortions are reduced, possibly also to take into account a perspective representation of the projected line with a vanishing point in the direction of travel or along the course of the road, for realistic representation with central projection. The projection provides a certain line width, so that the projected line of the vehicle assistance system is easily recognizable from the driver's perspective.

It is advantageous if the long sides of the essentially rectangular maximum intensity are horizontally oriented, to obtain a favorable light distribution for an additional high beam headlight.

In a preferred embodiment, the first maximum intensity lies horizontally within the horizontal width of the second maximum intensity. The small separation of the two maximum intensities makes the aperture of the entire optical system small, and achieves an especially small, compact, and economical design.

Another preferred embodiment of the additional headlight provides that the first maximum intensity and the second maximum intensity are arranged with a vertical separation from one another. Both light distributions of the additional headlight do have similar illumination characteristics, but preferably serve for different applications in the near and far areas in front of the vehicle. The line light of the first light module preferably projects a line on the road in the range of 2 to 20 meters in front of the vehicle, and the additional high beam light of the second light module projects in the high beam range, i.e., preferably at a distance of more than 50 meters, a rectangle to support another high beam light. For this reason, it is advantageous if the two light distributions have no overlap in their maximum intensities.

According to the invention the first and second light patterns can be projected simultaneously or alternatively, and the electrical or thermal system components are designed accordingly. For example, if it is specified that either only line light or only additional high beam light is active, preferably depending on the speed of the vehicle, then the common cooling device can be designed to be smaller and more economical. It is possible to use both an active and a passive cooling device.

An especially advantageous embodiment of the inventive additional headlight comprises:
- at least one first light module to produce a first light emission by at least one first light source;
- at least one second light module to produce a second light emission by at least one second light source;
- at least one primary optical system having multiple light guide elements and each light guide element having a light entrance surface to couple a light emission, and a light exit surface,
- the first light emission coupling into at least one first light guide element of the primary optics, and the second light emission coupling into at least one second light guide element of the primary optics,
- at least one mask that is downstream of the primary optics and that has at least one first mask opening facing the light exit surface of the first light guide element, and at least one second mask opening facing the light exit surface of the second light guide element, the primary optics and the mask producing an overall light image from the light emissions; and
- imaging optics downstream of the mask projecting the overall light image as a light pattern in the emission direction of the additional headlight in the form of an overall light pattern.

The mentioned arrangement creates an especially economical additional headlight, which produces the desired light distributions when installed in the vehicle and whose common primary optics and mask reduce the number of mounting devices during assembly, clearly improving its production through lower material costs, smaller size, and shorter assembly times.

It is especially favorable if all light exit surfaces of all light guide elements lie in one surface, since this simplifies the design.

The design is additionally simplified if the light exit surfaces of all light guide elements that are associated with the same light module form a common light exit surface.

An efficient embodiment of both light modules provides that all light guide elements of the first light module are structurally separated from those of the second light module, so that the two light modules are functionally decoupled and so that undesired light coupling from the respective other light module is reduced.

To simplify the design still more and to reduce production costs, a common holder is provided for all light guide elements.

In an especially favorable variant, the light output of the first light module is improved so that the first light module comprises multiple light sources, which are arranged one on top of the another, in an essentially vertical row.

In another especially favorable variant, the light output of the second light module is improved so that the second light module comprises multiple light sources, which are arranged next to one another, in an essentially horizontal row.

Since the imaging optics invert the orientation of the light pattern when it is projected, it is advantageous to take this circumstance into consideration in the arrangement of the light modules, by arranging the first light module over the second light module.

Cooling can be constructed to be especially economical if the first light module and the second light module are adjacent and make use of a common cooling device.

The controller can be constructed to be especially economical if the first light module and the second light module are controlled by a common controller.

It is favorable if unevenness in the road, vehicle load conditions, or windy roads are taken into consideration by making the additional headlight mechanically pivotable about at least one axis, and thus projecting the light patterns as a function of the situation and reducing the mentioned influence.

It is advantageous with regard to luminous efficiency, costs, and size to use light-emitting diodes (LEDs) or high power LEDs as light sources.

It is especially favorable if a headlight system is formed from multiple vehicle headlights and if an adaptive entire light pattern is formed by the light pattern of the inventive additional headlight being superimposed on at least one other light pattern of a main headlight, especially if a vehicle comprises a left and a right inventive additional headlight and a left and a right main headlight. Accordingly, the result is especially favorable, quite variable entire light patterns that preferably depend on the situation of the vehicle, if the left and right inventive additional headlights each project different light patterns.

A headlight system that is built with the additional headlight on the existing light distribution of the main headlight with a light distribution of a high beam light or a low beam light, is especially effective and economical.

The invention and its advantages are described in detail below on the basis of non-restrictive examples, which are illustrated in the attached drawings. The figures are as follows.

With reference to FIG. 1 through 27, a sample embodiment of the invention is now explained in detail. In particular, it shows the parts that are important for an inventive headlight, it being clear that a headlight also contains many other parts that allow it be used in a meaningful way in a motor vehicle, such as, in particular, a passenger vehicle or motorcycle.

FIGS. 1 through 9 show a sample embodiment of an inventive additional headlight.

Figure 13:
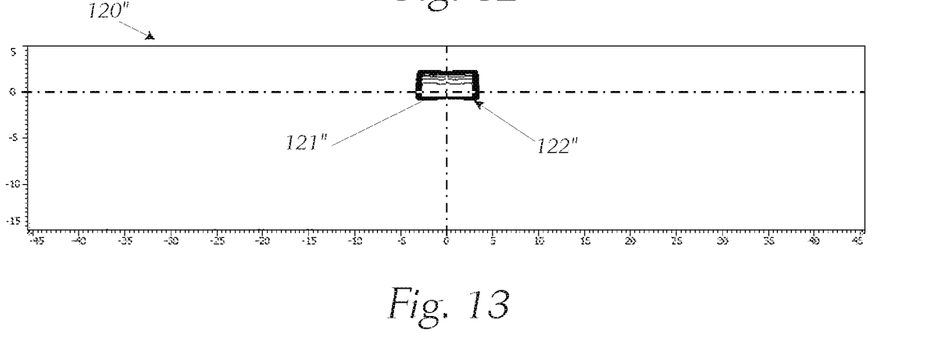
FIG. 13 A light pattern with the (rectangular) light distribution of an additional high beam light of the right high beam additional headlight.
Figure 14:
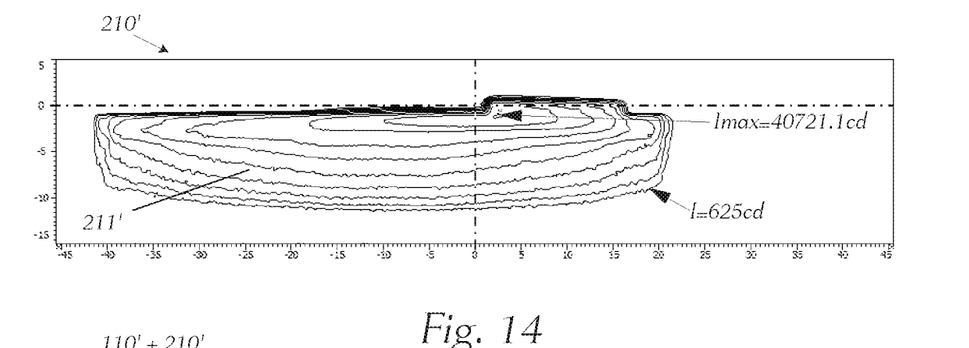
FIG. 14 A light pattern of the light distribution of a low beam light of the left main headlight.
Figure 15:
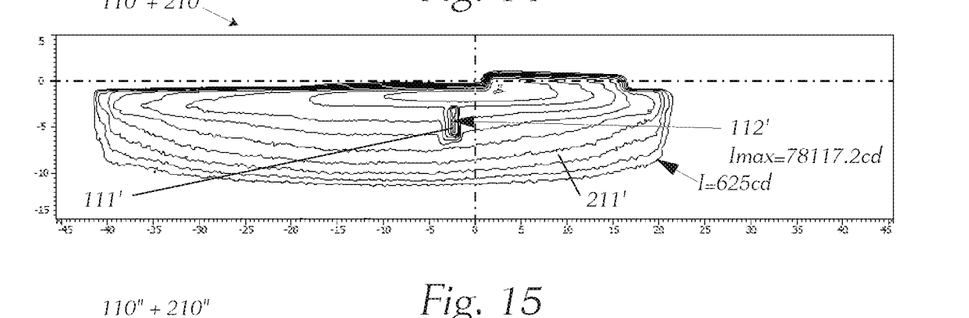
FIG. 15 A superimposed light pattern of low beam light from FIG. 14 and the line from FIG. 10 of the left main and additional headlights.

FIGS. 10 through 27 show various light distributions, FIG. 14 and FIG. 15 showing examples of the intensities of isolux curves whose intensities apply for all FIGS. 10 through 27. For example, a line projection according to FIG. 18 has a maximum intensity of about 78 kilocandelas, which is about twice as large as the maximum intensity of foreground illumination of a low beam light according to FIG. 14, which is about 40 kilocandelas. Such a difference in intensity is necessary to allow the driver to recognize contrast of a projected line with respect to a foreground illumination, that is, a turned on low beam function of the vehicle. The light intensities used as examples can be converted into illuminance values, as is familiar to the person skilled in the art.

Figure 1:
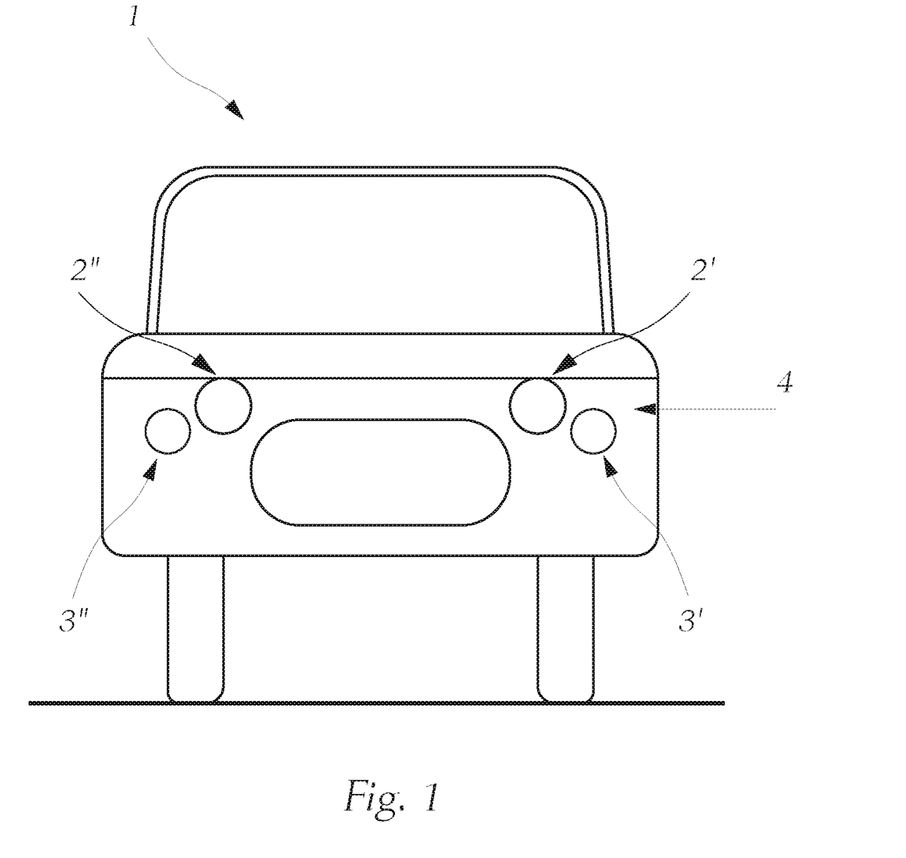
FIG. 1 A front view of a vehicle main headlights and inventive additional headlights.

FIG. 1 shows an overview of a vehicle 1 that has left and right main headlights 2' and 2" and inventive additional headlights 3' and 3". The two main headlights 2', 2" preferably produce a light distribution of low beam light or high beam light. The two inventive additional headlights 3', 3" produce a line-shaped light distribution and a light distribution of an additional high beam light in two modules, it being possible to activate all light distributions of the headlights individually or in combination and also to combine left and right headlights, to take the respective driving situation into account. The position of the individual headlights 2', 2", 3', and 3" on vehicle 1 can vary, and depends on the design of the vehicle, among other things. It can be advantageous for the position of the inventive additional headlights 2', 2" on vehicle 1 to be close to the road.

Furthermore, a headlight system 4 is shown that comprises a main headlight 2', 2" and an additional headlight 3', 3". In this case, a light pattern 110', 110" of the additional headlight 3', 3" can have another light pattern 210', 210", 220', 220" of the main headlight 2', 2" superimposed on it. The headlight system 4 of a vehicle 1 comprises a left and a right additional headlight 3', 3" and a left and a right main headlight 2', 2". Depending on the operating mode, each of the left and right additional headlights 3', 3" can project different light patterns. The light pattern of the main headlight 2', 2" can be a light pattern of a low beam light 210', 210" or of a high beam light 220', 220".

Figure 2A:
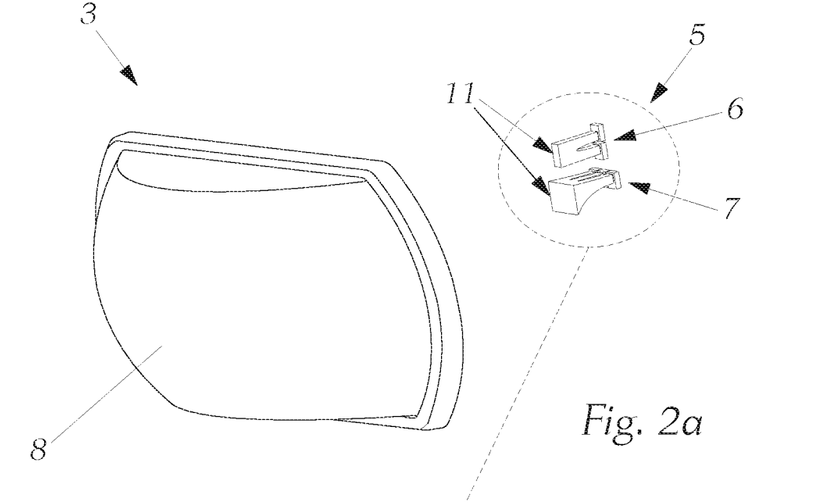
FIG. 2a A perspective view of the inventive additional headlight, without a mask.
Figure 2B:
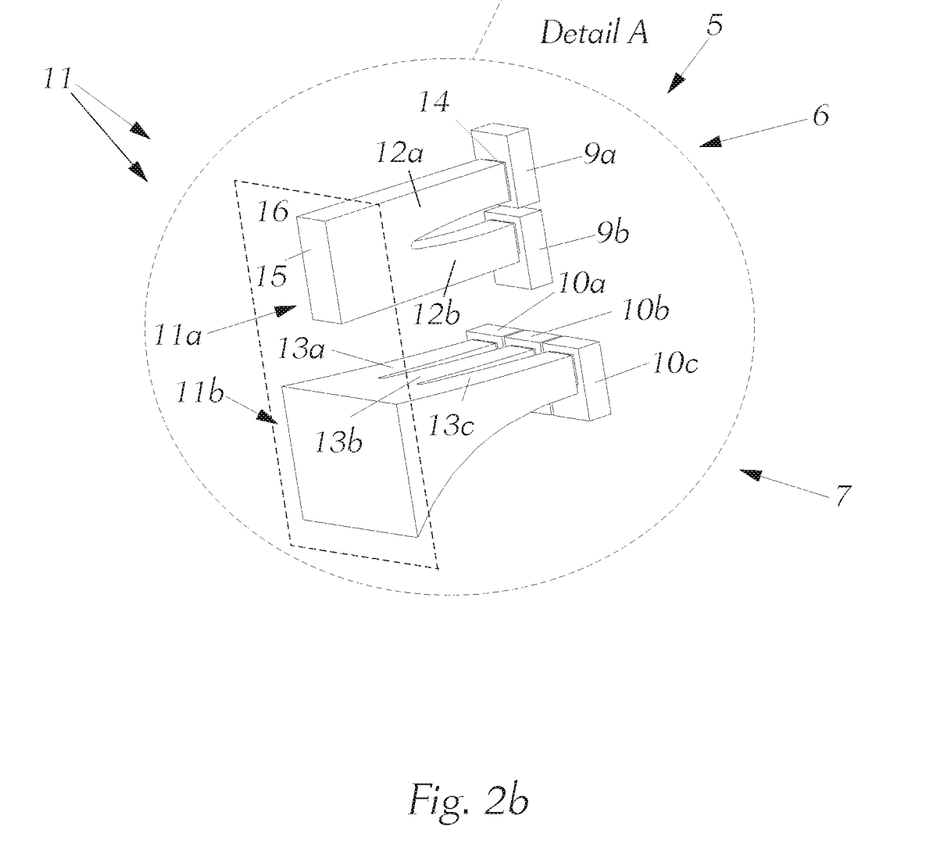
FIG. 2b A perspective view of detail A of an inventive light module.

FIG. 2a shows an overview of the arrangement of the additional headlight 3', 3" in the form of an additional headlight 3. The additional headlight 3 consists of a light module 5 that emits the light and, by means of downstream imaging optics 8, shapes and projects it in front of the vehicle in the form of a light pattern 110', 110". Detail A in FIG. 2b shows the light module 5, which comprises a first light module 6 to produce first light emissions by first light sources 9a and 9b and a second light module 7 to produce second light emissions by second sources 10a, 10b, 10c, and primary optics 11. The primary optics 11 of the additional headlight 3 comprise two parts, first primary optics 11*a* of the first light module and second primary optics 11*b* of the second light module, and has multiple light guide elements 12*a*, 12*b*, 13*a*, 13*b*, 13*c*, each of which has a light entrance surface 14 to couple a light emission, and a light exit surface 15. In this sample embodiment, the light guide elements 12*a*, 12*b*, 13*a*, 13*b*, 13*c* of the primary optics form two groups for two different light distributions, which are, with the associated light sources, represented by light modules 6 and 7. The structural separation of the two light modules decouples the optical propagation paths. The first light emission couples into a first light guide element 12*a*, 12*b* of the primary optics 11 and the second light emission couples into a second light guide element 13*a*, 13*b*, 13*c* of the primary optics 11. The light sources 9*a*, 9*b*, 10*a*, 10*b*, 10*c* can be loosely or solidly attached to the respective light entrance surfaces. The nature of attachment mentioned is determined by the implementation of the light sources 9*a*, 9*b*, 10*a*, 10*b*, 10*c*, among other things, it being possible for the design to provide a separation between the light entrance surfaces and the light sources, to be able to protect against mechanical loads such as, for example, vibrations or different coefficients of thermal expansion of individual components.

Light guide elements 12*a*, 12*b*, 13*a*, 13*b*, 13*c*, together with a mask 16, which comprises mask openings 16*a*, 16*b* (not shown in this figure) form the light emissions and form a light image on the common surface F, whose shape follows the Petzval surface of the imaging optics 8. The mask openings 16*a*, 16*b* of the mask 16 provide contours in the light image that are usually sharp, and the light guide elements 12*a*, 12*b*, 13*a*, 13*b*, 13*c* provide suitable flat emission characteristics. Usually, the cross section of the light guide elements 12*a*, 12*b*, 13*a*, 13*b*, 13*c* increases from the light entrance surface 14 toward the light exit surface 15. Consequently, the light exit surfaces 15 are larger than the corresponding light entrance surfaces 14 of the respective light guide elements 12*a*, 12*b*, 13*a*, 13*b*, 13*c*.

It is preferable for the light exit surfaces 14 of all light guide elements 12*a*, 12*b*, 13*a*, 13*b*, 13*c* to lie in one surface F. It is favorable if the surface F is a plane, which allows the primary optics 11 to have an especially simple design. Moreover, it is advantageous if the light exit surfaces of all light guide elements 12*a*, 12*b*, 13*a*, 13*b*, 13*c* that are associated with the same light module 6, 7 form a common light exit surface and if all light guide elements of the first light module 6 are structurally separated from those of the second light module 7, to reduce crosstalk between the two light modules 6 and 7. For high efficiency of the additional headlight 3 this is very important, since the light emission produced should be transformed into the desired light distribution as loss-free as possible.

The primary optics 11 can be made of an elastic material (e.g., silicone, photopolymers, etc.) or a rigid material (e.g., polycarbonate, thermoplastics, photopolymers, glass, etc.), the respective selection being determinable by commercial requirements. It is especially simple if the primary optics are produced by an injection molding process.

Figure 3A:
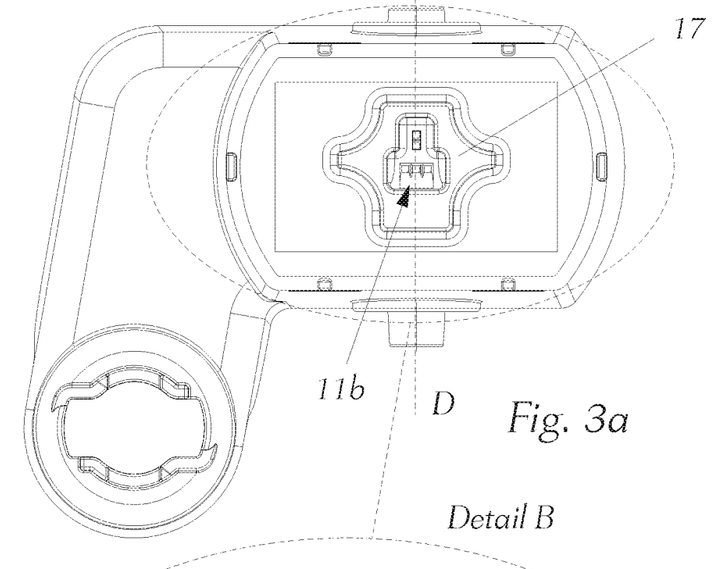
FIG. 3a A front view of the additional headlight, without mask.
Figure 3B:
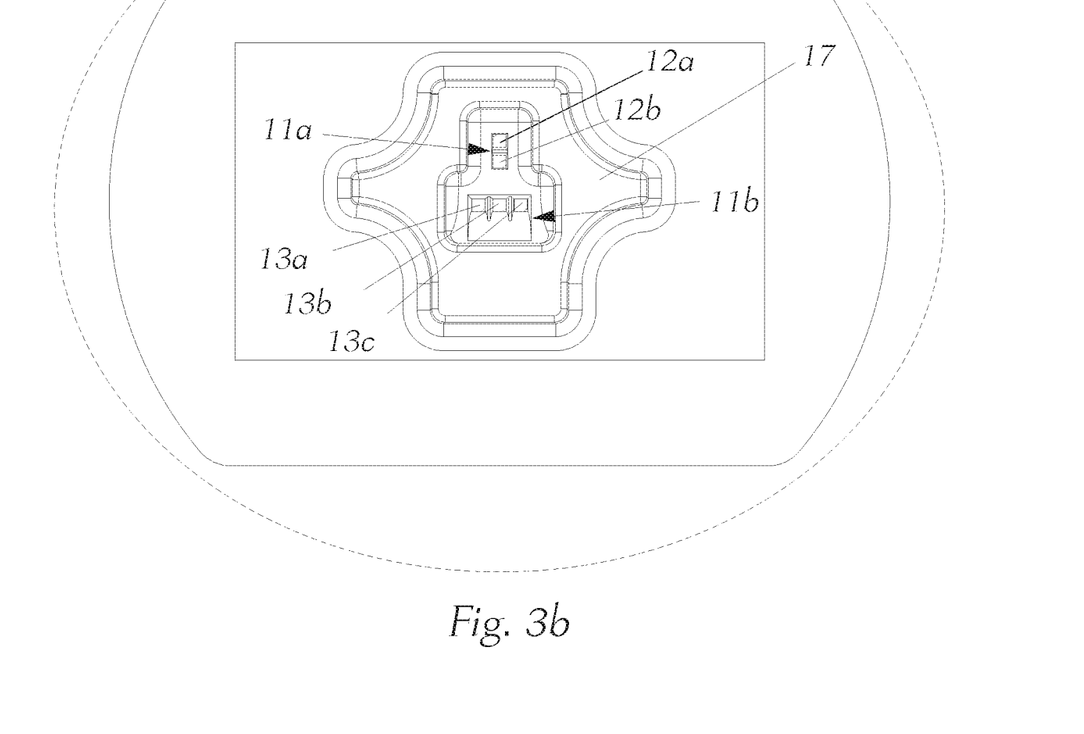
FIG. 3b A front view of detail B of the additional headlight.

FIG. 3*a* shows the additional headlight 3 with a holder 17 for mechanical fastening of the light modules 6 and 7 in the additional headlight 3, without a mask being mounted and without imaging optics 8. The detail B FIG. 3*b* shows the position of the first light module 6 to produce the line-shaped maximum intensity 8*a* by the associated light guide elements 12*a*, 12*b* and the position of the second light module 7 to produce the rectangular maximum intensity 122', 122" by the associated light guide elements 13*a*, 13*b*, 13*c* in the light distribution. In addition, an axis of rotation D is drawn in, about which the additional headlight 3 is mechanically pivotable, to allow the light distributions that are produced to be guided to follow the course of the road. A second axis of rotation to swivel about another axis, for example a horizontal axis, is not shown. Here the holder 17 is made as a single-piece, to fix the light guide elements of the primary optics 11. Consequently, only a common fastening is necessary, and the design, manufacturing, assembly; etc., are simplified.

Figure 4A:
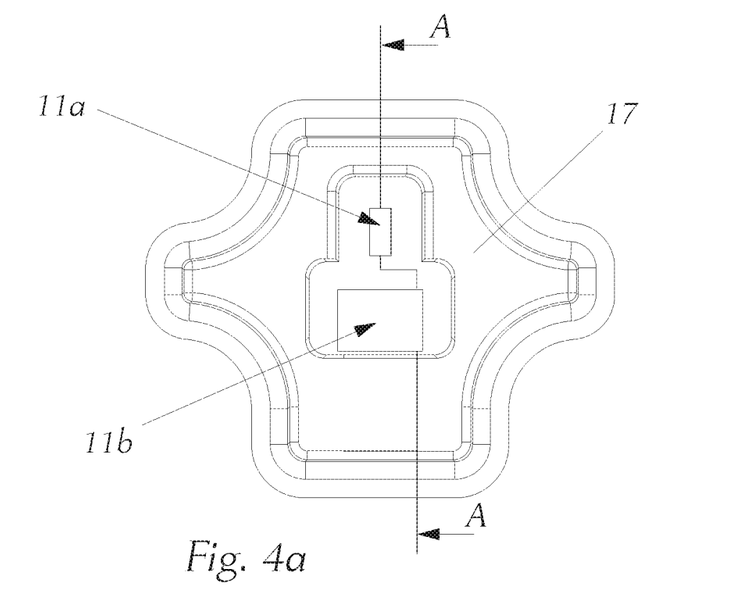
FIG. 4a A front view of the light module with holder, without mask.
Figure 4B:
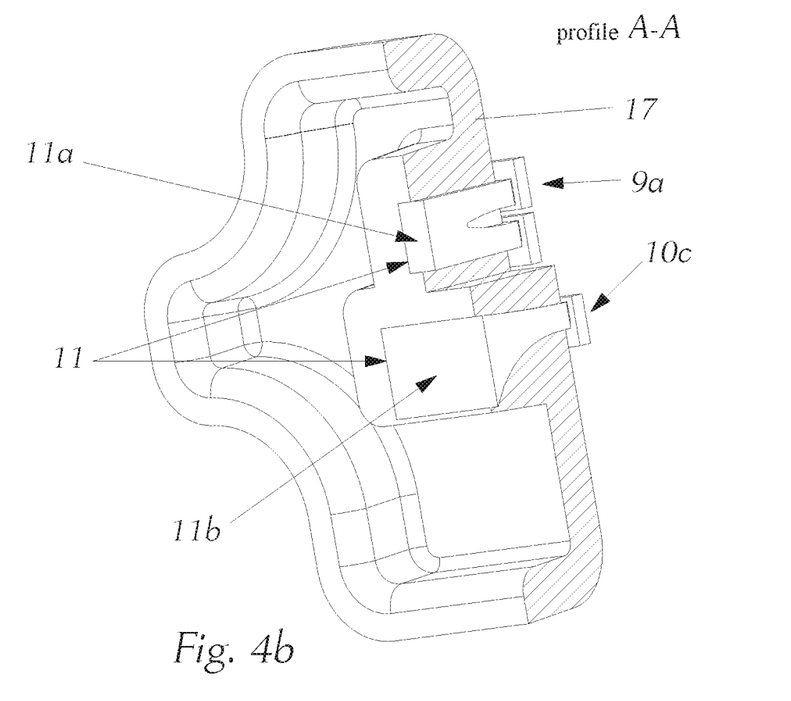
FIG. 4b A perspective detail view of the light module with holder, without mask, along section A-A.

FIG. 4*a* and FIG. 4*b* each show the light modules 6 and 7 or the two-part primary optics 11, which are held in position with a holder 17. The holder can made of an elastic or a rigid material, structural reinforcements only being advantageous in the area around the light guide elements 12*a*, 12*b*, 13*a*, 13*b*, 13*c* and the edge area of the holder 17, to keep the weight of the holder 17 as small as possible. The light sources 9*a*, 9*b*, 10*a*, 10*b*, 10*c* themselves are usually held by a printed circuit board (not shown).

Figure 5:
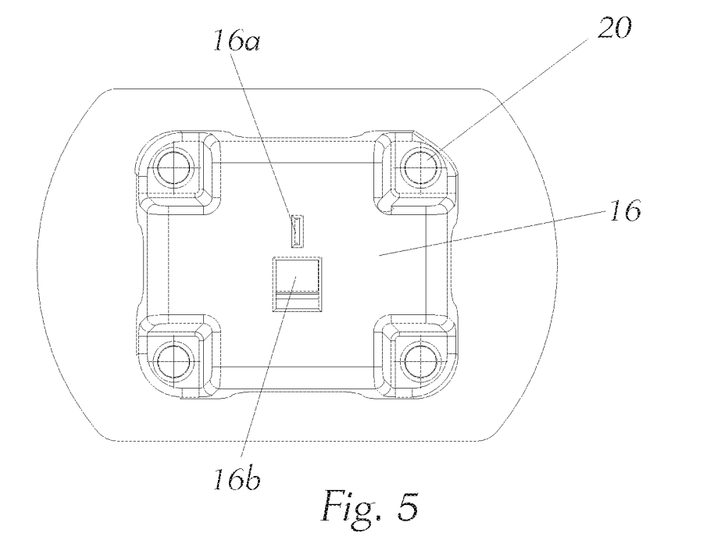
FIG. 5 A front view of the light module with a mask.

FIG. 5 shows a front view of the light module 6, 7 with mask 13 mounted, mask 13 having two mask openings 16*a*, 16*b*, which are—in addition to the light guide elements 12*a*, 12*b*, 13*a*, 13*b*, 13*c*—intended shape the light emissions. The mask 16 makes the contours in the light distribution especially sharp, which is essential, for example, for the line projection to make it visible due to good contrast. The common mask 16 allows, among other things, economical and simple design, manufacturing, and assembly, and supports the compact and light type of construction of the additional headlight. The mask 16 is fastened in the additional headlight 3 by one or more mounting points 20, it being especially advantageous for the mounting points 20 to be in the form of drill holes, through which screws pass and connect the mask with another part of the additional headlight 3. As an alternative to screws, plug-and-socket connections, rivets, or similar things are possible. On the other hand, an adhesive connection technique, for example, is also suitable to achieve a compact and light type of construction. In this example, the holder 17 is designed so that it has cutouts at the positions of the threaded connections to support common fastening, by the previously mentioned screws, of mask 16 with a housing of the additional headlight 3, and with holder 17 lying in between, the screws connecting the mask 16 with the housing of the additional headlight 3 and it being possible for a cooling device 18 to be part of the housing. Consequently, the assembly turns out to be especially simple and quick, and in addition the number of components required for the additional headlight 3 is kept to a minimum. The use of four screws is advantageous, and achieves special stability and freedom from distortion due to mechanical or thermal loads. Screws, which are a detachable connection, have especially favorable properties with respect to maintenance. Furthermore, the construction is especially simple, if the compound component made of a mask 16, a holder 17, and a housing of the additional headlight 3 has a printed circuit board 21 (not shown) inserted into it, this printed circuit board 21 comprising at least multiple light sources 9*a*, 9*b*, 10*a*, 10*b*, 10*c* and being fixed by the same fastening, the printed circuit board 21 or the light sources 9*a*, 9*b*, 10*a*, 10*b*, 10*c* arranged on it being thermally well connected with the housing.

Figure 6:
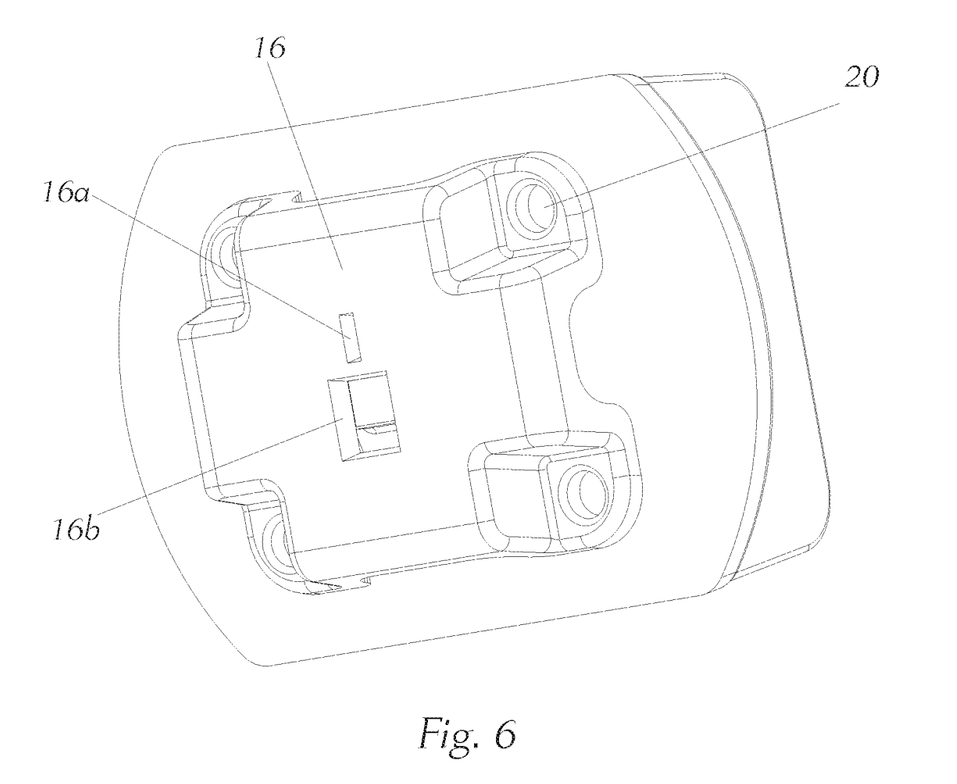
FIG. 6 A perspective view of the light module with the mask.

FIG. 6 shows a perspective view of light module 6, 7 with mounted mask 16 and mask openings 16*a*, 16*b*.

Figure 7:
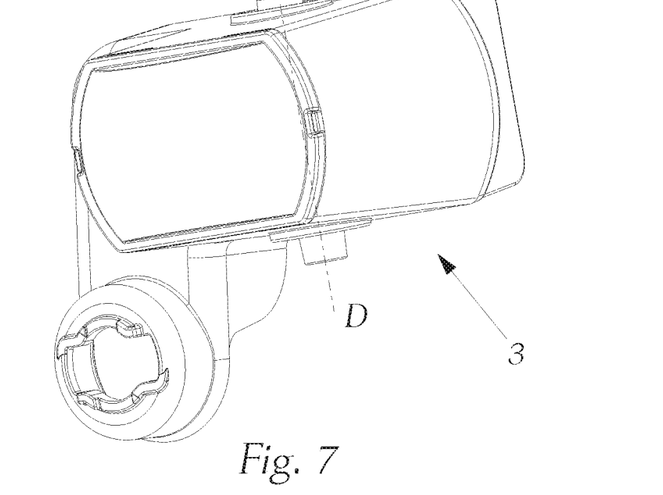
FIG. 7 A perspective view of the additional headlight with imaging optics.

FIG. 7 shows a front view of the very compact additional headlight 3, which has the imaging optics 8 put on it. The axis of rotation D is shown, about which the additional headlight 3 can be mechanically pivotable.

Figure 8:
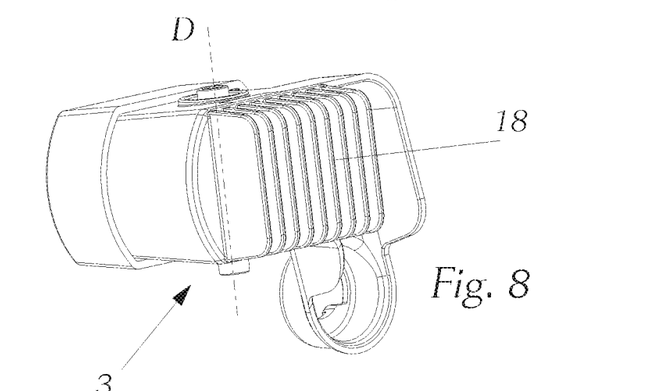
FIG. 8 A perspective rear view of the additional headlight with imaging optics and cooling fins.

FIG. 8 shows a rear view of the additional headlight 3 with the common cooling device 18 for the light module 6, 7 located on the back. Selective use of line light and additional high beam light, preferably depending on the speed of the vehicle, allows the common cooling device 18 to be designed to be small, light, and economical. The additional headlight 3 is pivotable about the axis of rotation D. Not shown is the common controller 19, which electrically controls the two light modules 6 and 7. The common controller 19 achieves cost and weight advantages.

Figure 9:
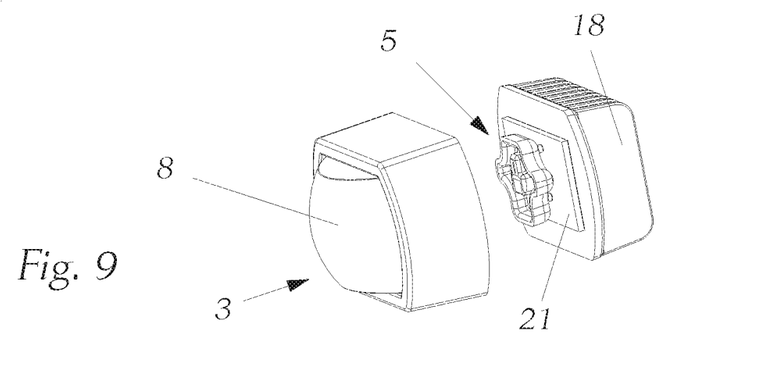
FIG. 9 An exploded view of the additional headlight with the imaging optics.

FIG. 9 shows an exploded view of the additional headlight 3 with imaging optics 8 and holder 17 and printed circuit board 21 with light sources 9a, 9b, 10a, 10b, 10c (not shown). The holder 17 can be made of an elastic material or a rigid material. The common holder 17 for the two-part primary optics 11 supports simple design and assembly, and a compact type of construction of the additional headlight. The printed circuit board 21 usually can comprise, along with the light sources 10, other electronic circuits, such as driver and logic circuits for switching the light sources 9a, 9b, 10a, 10b, 10c or the controller, and terminal units for connection of cables for control and power supply. It is advantageous for the terminal units of both light modules to have a common design, to keep the wiring harness in the vehicle simple. The printed circuit board 21 can be designed so that it supports a suitable thermal connection between light sources 10 and cooling device 18, for example by openings in the printed circuit board 21. In many cases, that of the optical emission surface of the light source 10 is equipped with special cooling contacts, to allow a favorable connection with a heat sink. The cooling by the cooling device 18 can have an active design, i.e., by a fan for air cooling, or liquid cooling; in the example shown in the figure the cooling device 18 is a passive heat sink.

FIG. 10 through FIG. 27 show light patterns in a Cartesian representation with angular scales on both axes according to the UNECE guidelines for uniform conditions for the approval of motor vehicle headlights (e.g., TRANS/WP.29/343), which show isolux lines for various intensities.

After that, light patterns of light distributions are shown, the light patterns that are projected in front of the vehicle by the headlights 2', 3' that are located on the left of vehicle 1 in the direction of travel being labeled with a single apostrophe >'<, and those that are projected in front of the vehicle by the headlights 2", 3" that are located on the right of vehicle 1 in the direction of travel being labeled with a double apostrophe >"<.

Accordingly, below a left main headlight is labeled with the reference number 2' and a right main headlight is labeled with the reference number 2", the main headlights typically having the same conception, however being built symmetrically mirrored about the longitudinal axis of the vehicle.

Figure 10:
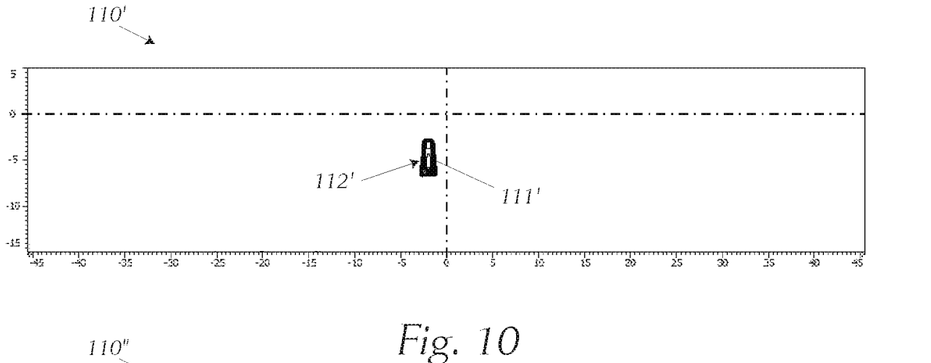
FIG. 10 A light pattern with a line-shaped light distribution of a left additional headlight.

The left additional headlight 3', which structurally corresponds, for example, to an additional headlight 3 according to FIG. 1 through 9, can, for example produce, by a first left light module 6', which structurally corresponds to the first light module 6, a light pattern 110' (FIG. 10).

Figure 11:
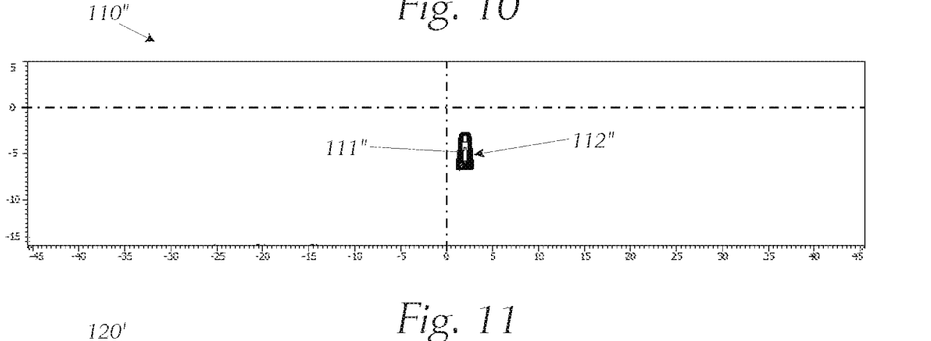
FIG. 11 A light pattern with a line-shaped light distribution of a right additional headlight.

The right additional headlight 3", which structurally corresponds, for example, to an additional headlight 3 according to FIG. 1 through 9, can, for example produce, by a first right light module 6", which structurally corresponds to the first light module 6, a light pattern 110" (FIG. 11).

Consequently, simultaneous operation of the first light module 6' of the left additional headlight 3' and the first light module 6" of the right additional headlight 3" produces a common light pattern, which is shown below in various configurations.

The light patterns 110' and 110" can each have line light distributions 111', 111" with line-shaped maximum intensities 112' and 112".

It is clear that the light distributions shown are partly formed by the superimposition of multiple light distributions. Consequently, the maximum intensities shown as examples are, strictly speaking, a superimposition of a single maximum intensity with another light distribution at the site of the maximum, which means that the value of the respective function at that site no longer exactly corresponds to the original maximum intensity. However, for clarity this aspect is disregarded and not separately shown in the figures. This aspect is a matter of principle, and therefore also applies in the case of the light distributions in the other figures.

In this sample embodiment, the left and right main headlights 2', 2" comprise light functions for a low beam light 210', 210" and a high beam light 220', 220".

FIG. 10 shows the light pattern 110' of the left additional headlight 3' with its first light distribution 111' and its first, line-shaped maximum intensity 112', i.e., a line light distribution.

FIG. 11 shows the light pattern 110" of the right additional headlight 3" with its first light distribution 111" and its first, line-shaped maximum intensity 112", i.e., a line light distribution.

Figure 12:
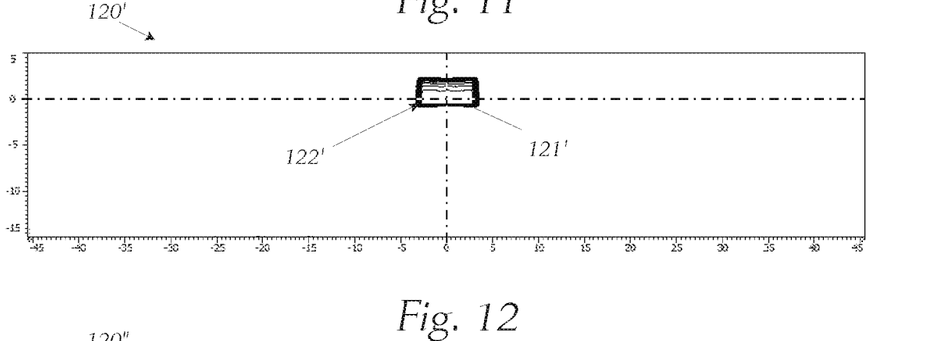
FIG. 12 A light pattern with the (rectangular) light distribution of an additional high beam light of the left additional headlight.

FIG. 12 shows the light pattern 120' of the left additional headlight 3' with its second light distribution 121' and its second essentially rectangular maximum intensity 122', i.e., an additional high beam light distribution. The essentially rectangular maximum intensity 122' can be, for example, square, rectangular, trapezoidal, or even elliptical, and can have sharp or rounded corners. Special shapes of the maximum intensity 122' are just as conceivable to obtain the best possible light distribution for the traffic situation. In the same way, it is possible for the maximum intensity 122' to have a dynamic shape that is actively adapted to the respective traffic situation, for example. This dynamic adaptation can mean selectively turning off individual areas within the maximum intensity 122', to obtain glare-free high beams and to mask out the oncoming traffic at certain points.

FIG. 13 shows the light pattern 120" of the right additional headlight 3" with its second light distribution 121" and its second essentially rectangular maximum intensity 122", e.g., an additional high beam light distribution.

FIG. 14 shows a light pattern 210' of a light distribution 211' of a low beam light of the left main headlight 2' with typical asymmetry in the light/dark boundary.

FIG. 15 shows the light pattern 110' of the left additional headlight 3' with the line-shaped light distribution 111' according to FIG. 10, on which the light pattern 210' [with ?] the low beam light distribution 211' of the left main headlight 2' according to FIG. 14 is superimposed. The maximum intensity 112' of about 78 kilocandelas is about twice as large as the maximum intensity of a foreground illumination or of a low beam light according to FIG. 14, which is about 40 kilocandelas.

Figure 16:
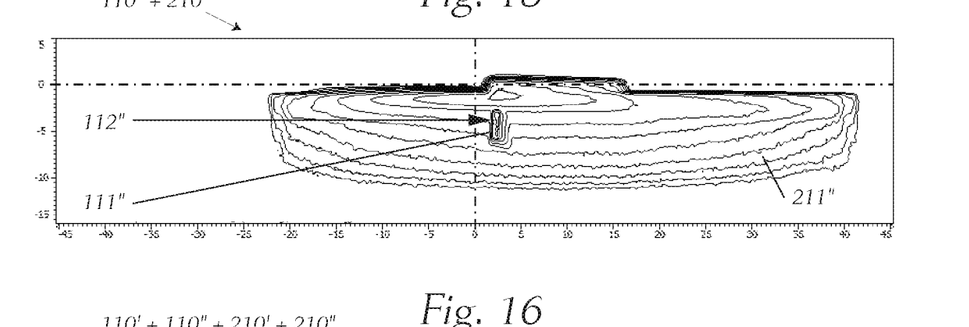
FIG. 16 A superimposed light pattern of low beam light and the line from FIG. 11 of the right main and additional headlights.

FIG. 16 shows the light pattern 110" of the right additional headlight 3" with the line-shaped light distribution 111" with maximum intensity 112" according to FIG. 11, on which the light pattern 210" with the low beam light distribution 211" of the right main headlight 2" is superimposed.

Figure 17:
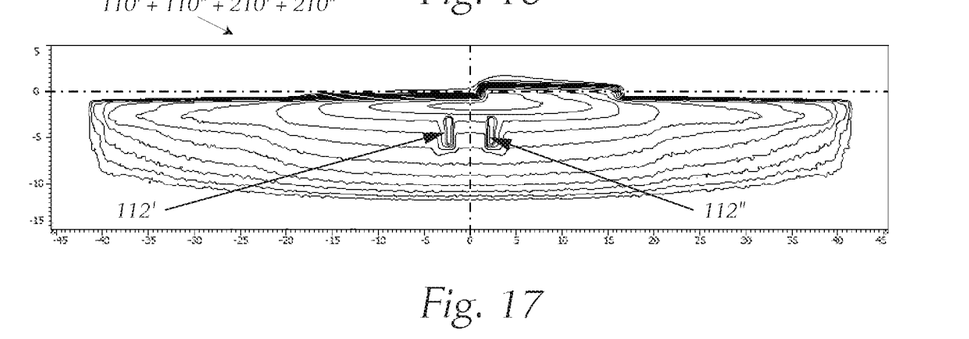
FIG. 17 A superimposed entire light pattern of left main and additional headlights from FIG. 15 and right main and additional headlights from FIG. 16.

FIG. 17 shows the superimposed entire light pattern of the light patterns 110', 110" according to FIGS. 15 and 16 of the left and right additional headlights 3', 3" with line-shaped maximum intensities 112', 112" in the respective light distribution 111', 111", and the light patterns 210', 210" of the light distributions 211', 211" of the left and right main headlights 2', 2", each with a low beam light distribution.

Figure 18:
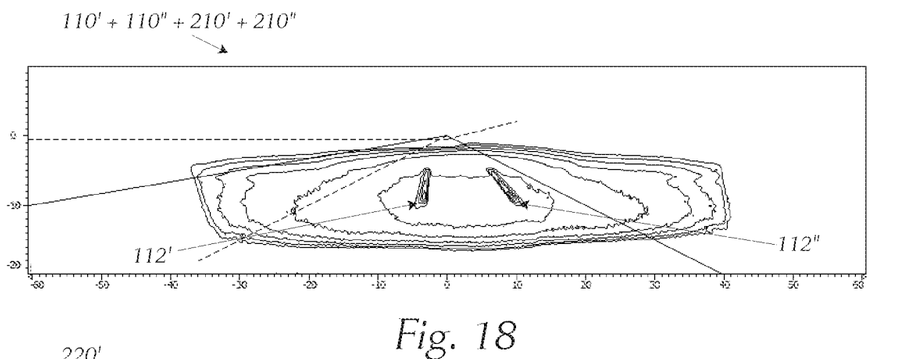
FIG. 18 A superimposed entire light pattern of the left main and additional headlights from FIG. 15 and the right main and additional headlights from FIG. 16, this light pattern being projected on the road in front of the vehicle.

FIG. 18 shows the entire light distribution according to FIG. 17 as a light pattern projected onto the road in front of the vehicle 1. In comparison with the previously mentioned light patterns, the projection view contains perspective image distortions.

Figure 19:
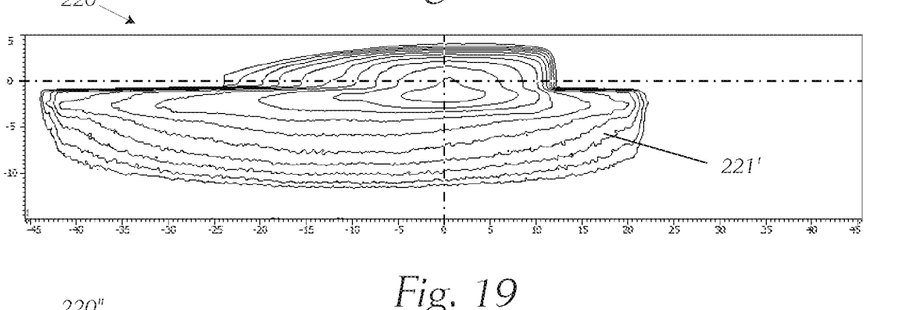
FIG. 19 A light pattern of the light distribution of a high beam light of the left main headlight.

FIG. 19 shows a light pattern 220' of a high beam light distribution 221' of the left main headlight 2'.

Figure 20:
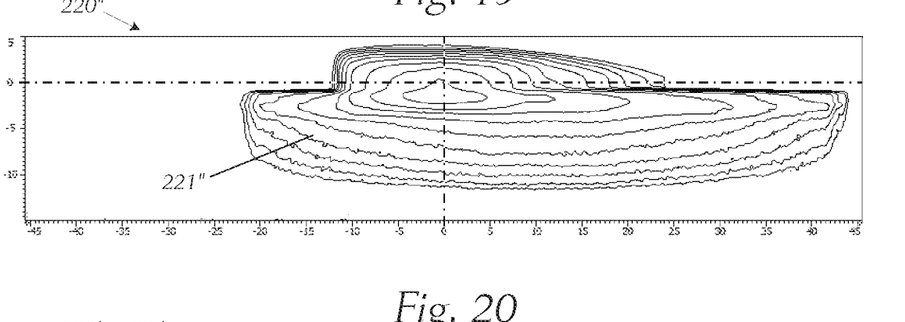
FIG. 20 A light pattern of the light distribution of a high beam light of the right main headlight.

FIG. 20 shows a light pattern 220" of a high beam light distribution 221" of the right main headlight 2".

Figure 21:
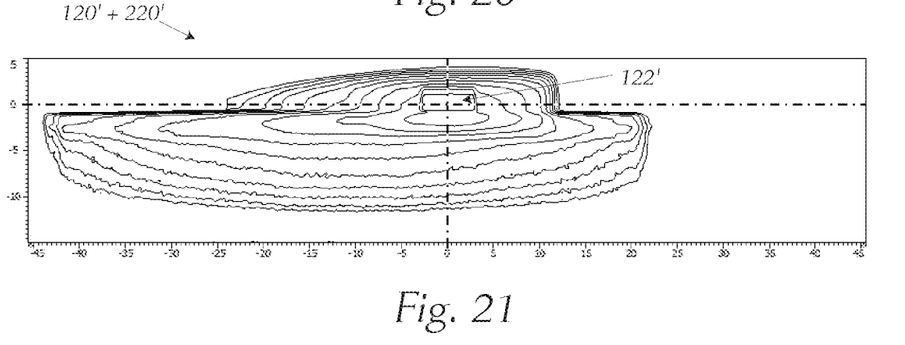
FIG. 21 A superimposed light pattern of high beam light from FIG. 19 and additional high-beam light from FIG. 12 of the left main and additional headlights.

FIG. 21 shows the light pattern 220' with the high beam light distribution 221' of the left main headlight 2' together with the additional high beam light distribution 121' and the maximum intensity 122' of the left additional headlight 3'.

Figure 22:
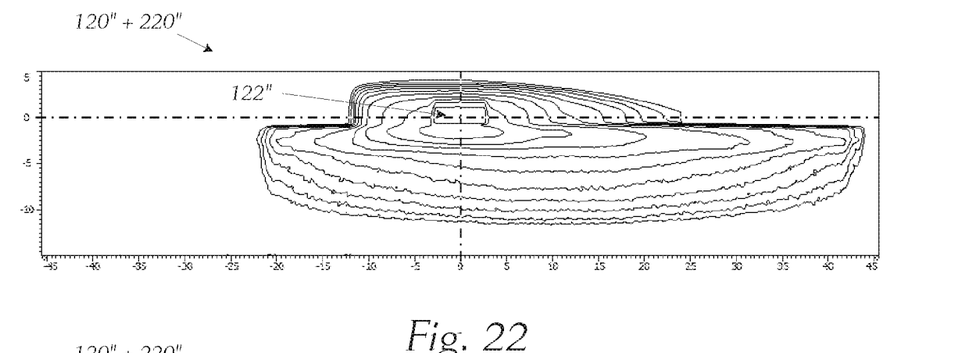
FIG. 22 A superimposed light pattern of high beam light from FIG. 20 and additional high-beam light from FIG. 13 of the right main and additional headlights.

FIG. 21 shows the light pattern 220" with the high beam light distribution 221" of the right main headlight 2" together with the light pattern 120" of the additional high beam light distribution 121" and the maximum intensity 122" of the right additional headlight 3".

Figure 23:
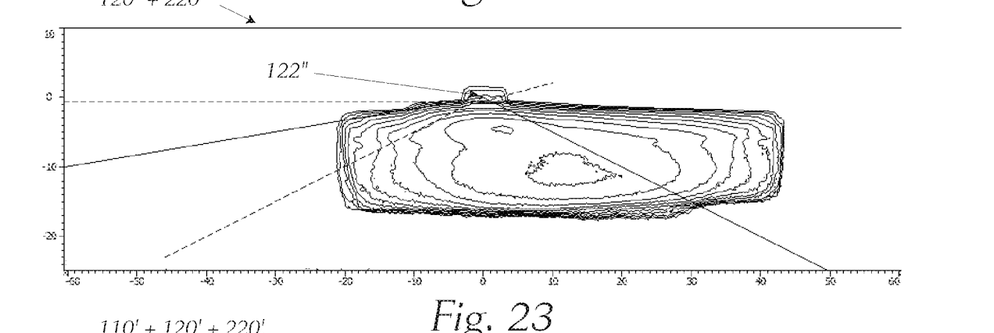
FIG. 23 A light pattern of the right main and additional headlights from FIG. 22, this light pattern being projected on the road in front of the vehicle.

FIG. 23 shows a light distribution according to FIG. 22 as a light pattern projected onto the road in front of the vehicle 1.

Figure 24:
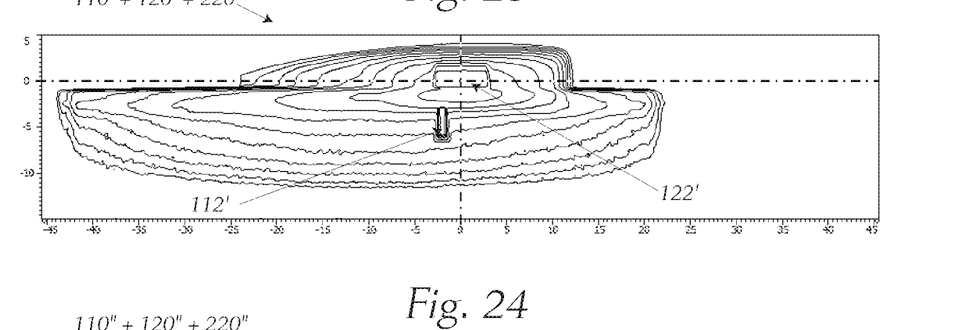
FIG. 24 A superimposed light pattern of high beam light from FIG. 10 and additional high-beam light from FIG. 12 and line light from FIG. 10 of the left main and additional headlights.

FIG. 24 shows the light pattern 220' with the high beam light distribution 221' of the left main headlight 2' together with the light pattern 120' of the additional high beam light distribution 121' and the light pattern 110' with the line light distribution 111' of the left additional headlight 3'.

Figure 25:
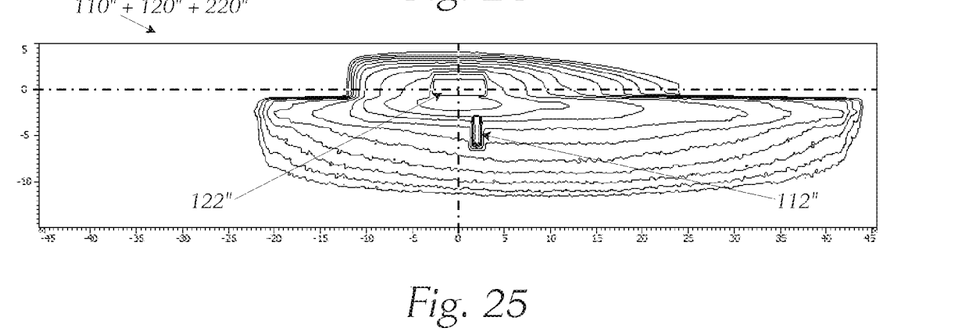
FIG. 25 A superimposed light pattern of high beam light from FIG. 20 and additional high-beam light from FIG. 13 and line light from FIG. 11 of the right main and additional headlights.

FIG. 25 shows the light pattern 220" with the high beam light distribution 221" of the right main headlight 2" together with the light pattern 120" of the additional high beam light distribution 121" and the light pattern 110" with the line light distribution 111" of the right additional headlight 3".

Figure 26:
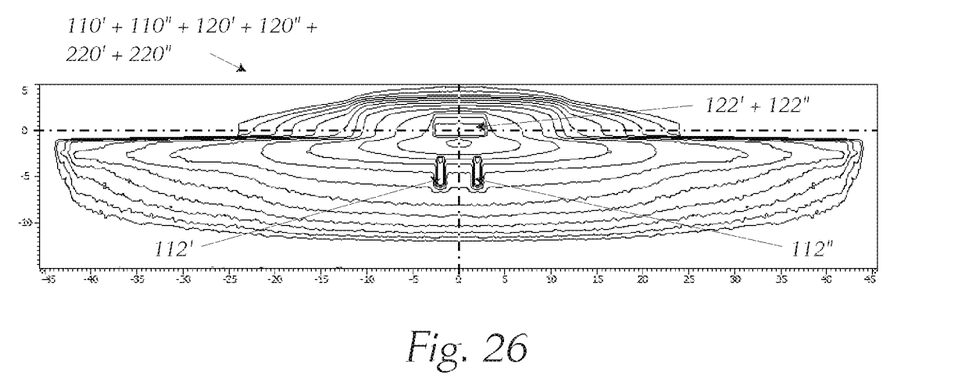
FIG. 26 A superimposed entire light pattern of left main and additional headlights from FIG. 24 and right main and additional headlights from FIG. 25.

FIG. 26 shows an entire light pattern of the light patterns 110', 120', 110", 120" of a superimposed entire light distribution of the left and right additional headlight 3', 3" with line-shaped maximum intensities 112', 112" in the respective light distribution 111', 111" together with the respective additional high beam light distribution 121', 121" and the respective maximum intensity 122', 122', and of the left and right main headlight 2', 2" each with a light pattern 220', 220" that comprises a high beam light distribution 221', 221".

LIST OF REFERENCE NUMBERS

1 Vehicle
2', 2" Main headlight
3, 3', 3" Additional headlight
4 Headlight system
5 Light module
6 First light module
7 Second light module
8 Imaging optics
9a, 9b Light sources of first light module
10a, 10b, 10c Light sources of second light module
11 Primary optics of additional headlight
11a First primary optics of first light module
11b Second primary optics of second light module
12a, 12b Light guide elements of first light module
13a, 13b, 13c Light guide elements of second light module
14 Light entrance surface of a light guide element
15 Light exit surface of a light guide element
16 Mask
16a First mask opening for first light module
16b Second mask opening for second light module
17 Holder
18 Cooling device
19 Controller
20 Mounting point
21 Printed circuit board
F Surface
D Axis of rotation
110', 110" Light pattern of first light module of additional headlight
111', 111" Light distribution of first light module of additional headlight
112', 112" Maximum intensity of light distribution of first light module of additional headlight
120', 120" Light pattern of second light module of additional headlight
121', 121" Light distribution of second light module of additional headlight
122', 122" Maximum intensity of light distribution of second light module of additional headlight
210', 210" Light pattern of main headlight for low beams
211', 211" Low beam light distribution of main headlight
220', 220" Light pattern of main headlight for main high beam light
221', 221" High beam light distribution of main headlight

The invention claimed is:

1. An additional headlight (3, 3', 3") for a vehicle, wherein the additional headlight is configured to produce a light pattern in front of the vehicle (1) by emitting light from at least one light module (4) and to project this light pattern in front of the vehicle by downstream imaging optics (8), the additional headlight comprising:

a first light module (6) set up to produce a first light pattern (110', 110") with at least one first light distribution (111', 111") with at least one first essentially vertically oriented line-shaped maximum intensity (112', 112");

a second light module (7) set up to produce a second light pattern (120', 120") with a second light distribution (121', 121") with at least one second, essentially rectangular maximum intensity (122', 122"), wherein the first and second light patterns (110', 110", 120', 120") are superimposed, the first maximum intensity (112', 112") being located vertically under the second maximum intensity (122', 122"), wherein the one first light module (6) is configured to produce a first light emission by at least one first light source (9a, 9b), and the second light module (7) is configured to produce a second light emission by at least one second light source (10a, 10b, 10c);

at least one primary optical system (11), having multiple light guide elements (12a, 12b, 13a, 13b, 13c), each light guide element (12a, 12b, 13a, 13b, 13c) having a light entrance (14) surface to couple a light emission, and a light exit surface (15), the first light emission coupling into at least one first light guide element (12a, 12b) of the primary optics (11), and the second light emission coupling into at least one second light guide element (13a, 13b, 13c) of the primary optics (11);

at least one mask (16) that is downstream of the primary optics (11) and that has at least one first mask opening (16a) facing the light exit surface of the first light guide element (12a, 12b), and at least one second mask opening (16b) facing the light exit surface of the second light guide element (13a, 13b, 13c), the primary optics (11) and the mask (16) producing an overall light image from the light emissions; and imaging optics (8) downstream of the mask (16) projecting the overall light image as a light pattern in the emission direction of the additional headlight (3, 3', 3") to produce an overall light pattern.

2. The additional headlight (3, 3', 3") according to claim 1, wherein the long sides of the essentially rectangular maximum intensity (122', 122") are horizontally oriented.

3. The additional headlight (3, 3', 3") according to claim 1, wherein the horizontal position of the first maximum intensity (112', 112") lies within the horizontal width of the second maximum intensity (122', 122").

4. The additional headlight (3, 3', 3") of claim 1, wherein the first maximum intensity (112', 112") and the second maximum intensity (122', 122") have a vertical separation from one another.

5. The additional headlight (3, 3', 3") according to claim 1, wherein the light exit surfaces (15) of all light guide elements (12a, 12b, 13a, 13b, 13c) lie in one surface (F).

6. The additional headlight (3, 3', 3") according to claim 5, the one surface (F) is a plane.

7. The additional headlight (3, 3', 3") according to claim 5, wherein the light guide elements (12a, 12b, 13a, 13b, 13c) together with the mask (16), which comprises the at least one first mask opening (16a) and the at least one second mask opening (16b), form the first light emission and second light emission and form a light image on the one surface (F), which has a shape that follows a Petzval surface of the imaging optics (8).

8. The additional headlight (3, 3', 3") according to claim 1, wherein the light exit surfaces (15) of all light guide elements (12a, 12b, 13a, 13b, 13c) that are associated with the same light module (6, 7) form a common light exit surface.

9. The additional headlight (3, 3', 3") according to claim 1, wherein the light guide elements (12a, 12b, 13a, 13b, 13c) of the first light module (6) are structurally separated from those of the second light module (7).

10. The additional headlight (3, 3', 3") according to claim 1, wherein a common holder (17) is provided for all light guide elements (12a, 12b, 13a, 13b, 13c).

11. The additional headlight (3, 3', 3") according to claim 1, wherein the first light module (6) comprises multiple light sources (9a, 9b), which are arranged one on top of the another, in an essentially vertical row.

12. The additional headlight (3, 3', 3") according to claim 1, wherein the second light module (7) comprises multiple light sources (10a, 10b, 10c), which are arranged one on top of the another, in an essentially horizontal row.

13. The additional headlight (3, 3', 3") according to claim 1, wherein the first light module (6) is arranged vertically over the second light module (7).

14. The additional headlight (3, 3', 3") according to claim 1, wherein the mask openings (16a, 16b) of the mask (16) are essentially line-shaped and/or rectangular.

15. The additional headlight (3, 3', 3") according to claim 1, wherein the first light module (6) and second light module (7) are arranged on a common cooling device (18).

16. The additional headlight (3, 3', 3") according to claim 1, wherein the first light module (6) and second light module (7) are controlled by a common controller (19).

17. The additional headlight (3, 3', 3") according to claim 1, wherein the additional headlight (3, 3', 3") is pivotable about at least one axis (D).

18. The additional headlight (3, 3', 3") according to claim 1, wherein the light sources (9a, 9b, 10a, 10b, 10c) are LEDs.

19. A headlight system (4) comprising:
at least one main headlight (2', 2"); and
at least one additional headlight (3, 3', 3") according to claim 1,
wherein that the light pattern (110', 110", 120', 120") of the additional headlight (3, 3', 3") has at least one other light pattern (210', 210", 220', 220") of the main headlight (2', 2") superimposed on it.

20. The headlight system (4) according to claim 19, wherein a vehicle (1) comprises a left and a right additional headlight (3', 3") and a left and a right main headlight (2', 2").

21. The headlight system (4) according to claim 20, wherein the left and right additional headlight (3', 3") each project different light patterns (110', 110", 120', 120").

22. The headlight system (4) according to claim 20, wherein the light pattern (210', 210", 220', 220") of the main headlight (221', 221") is a light distribution of a high beam light or of a low beam light (211', 211").

* * * * *